Patented Apr. 8, 1941

2,237,625

UNITED STATES PATENT OFFICE 2,237,625

SULPHURIZATION OF SULPHUR-CONTAINING ORGANIC COMPOUNDS

John F. Olin, Grosse Ile, Mich., assignor to The Sharples Solvents Corporation, Philadelphia, Pa.

No Drawing. Application October 7, 1938, Serial No. 233,800

18 Claims. (Cl. 260—125)

This invention relates to a process for sulphurizing organic compounds and is more particularly directed to the sulphurization of compounds of the nature of mercaptans, organic sulphides and other organic compounds containing sulphur linked to a single carbon atom; e. g., mercaptans, thio acids and thio phenols.

During the past several years new and highly valuable uses have been found for organic compounds containing a relatively large percentage of sulphur or having sulphur to sulphur linkages in the molecule. Among the more important commercial developments of this nature are the compounding of extreme pressure lubricants and the acceleration of rubber treating processes. In both capacities di-, tri-, and other poly-sulphides of an organic nature are now generally recognized as materials of great and increasing commercial value.

The preparation of these compounds has, however, been a problem of considerable difficulty from the industrial stand-point. Recently, a process for the preparation of di-sulphides by the reaction between a hydrogen poly-sulphide and an olefin has been described in Letters Patent 2,061,018 to Wallace H. Carothers. This reaction gives satisfactory results in connection with those unsaturated aliphatic compounds having highly reactive multiple bonds, but is of relatively minor importance as a general method of preparation. An improvement on the Carothers technique is described in Letters Patent 2,061,019, issued to Carter and Downing. According to the latter process, the poly-sulphide of the Carothers reaction is formed in the reaction mixture by the action of hydrogen sulphide and sulphur on a basic substance. This is of course subject to the limitations of the earlier procedure and is not generally applicable.

It has now been found that aliphatic polysulphides in general may be synthesized by reacting sulphur with a mercaptan or poly-sulphide lower in sulphur content than that desired, in the presence of a catalyst of alkaline reaction. The process of the present invention is applicable to the sulphurization of sulphur-containing compounds having a sulphur atom or sulphydryl radical attached to an alkyl, alicyclic, cyclic, or heterocyclic radical, except compounds in which a single sulphur atom is doubly linked directly to one or more such radicals, e. g., an alkyl mono-sulphide or thiophene. The present process involves the preparation of useful organic compounds of sulphur from relatively inexpensive raw materials.

The formation of compounds of the nature of di-alkyl di-sulphides from mercaptans is generally regarded as an oxidation reaction and prior to this invention has been caused by treatment with oxidizing agents such as oxygen bearing gases, acids and oxides of nitrogen, chlorates and the like. In view of the fact that the present invention provides a means to convert di-sulphides to tri-sulphides and tri-sulphides to tetra-sulphides as well as mercaptans to di-sulphides, it is found advisable to use the term "sulphurization" to characterize the reaction involved. The novel reaction of this invention is achieved by reacting mercaptans or poly-sulphides with elemental sulphur in the presence of a very small amount of a basic catalyst.

EXAMPLE I.—*Action of sulphur upon amyl mercaptan.*—250 g. of amyl mercaptan and 75 g. of sulphur were placed in a 1 liter round-bottom flask under a condenser. One drop of mono-amyl amine was added and reaction began almost immediately in the cold. The reaction was allowed to proceed to completion and the mixture was then warmed to about 140° C. The weight of the crude reaction product was 298 g., showing that about 27 g. of hydrogen sulphide had been evolved. The mixture was vacuum distilled and 30 g. of heads boiling below 130° C. at 14 mm. of mercury absolute pressure were obtained. The reaction product was obtained as a distillate boiling between 130° C. and 155° C. at 14 mm. The weight of this cut was 210 g. It was found, upon analysis, to contain 38.8% sulphur and had an average molecular weight of 211.7. Di-amyl di-sulphide should contain 33.3% sulphur and have a molecular weight of 206. It was therefore concluded that the product obtained as a result of the above experiment contained approximately 50% di-amyl di-sulphide and 50% di-amyl tri-sulphide.

EXAMPLE II.—*Action of sulphur upon n-butyl mercaptan.*—342 g. of butyl mercaptan was reacted with 115 g. of sulphur in the same general manner discussed above in connection with Example I, 2 drops of di-ethyl amine being used as a catalyst. The weight of the reaction product was 408 g., showing that 49 g. of material had been lost as hydrogen sulphide. Upon vacuum distillation of the product, 40 g. of material boiling below 122° C. at 20 mm. was obtained. The bulk of this was butyl mercaptan and butyl chloride present as a contamination in the butyl mercaptan used. A second cut of 174 g. was obtained, which boiled between 122° C. and 142° C. at 20 mm. This cut was found to have an average molecular weight of 171.2 and contained 40.1% sulphur. A third cut boiling between 135° C. and 143° C. at 14 mm., and weighing 172 g., was obtained. It had a molecular weight of 192.1 and contained 46.13% sulphur. The second cut consisted principally of di-butyl di-sulphide, with a small quantity of di-butyl tri-sulphide and the third cut was essentially di-butyl tri-sulphide.

The formation of tri-sulphides appears to be the result of sulphurizing the di-sulphide formed from mercaptans and the higher sulphides can be obtained by substituting an aliphatic di-sulphide for the mercaptan used in the above examples. Further amounts of sulphur may be introduced into the molecule either by successive treatments with small amounts of free sulphur in the presence of a basic catalyst with purification at each stage or by the addition to the reaction mixture containing mercaptan of an excess of sulphur and prolonged time of treatment with the application of heat if necessary. In the latter case the product is a mixture of poly-sulphides containing varying amounts of sulphur. In accordance with the theory that poly-sulphides containing larger proportions of sulphur are formed by a series of reactions, one atom of sulphur being added in each step, it is found that longer reaction periods are of considerable importance in the preparation of highly sulphurized compounds.

EXAMPLE III.—*Tertiary butyl tetrasulphide from tertiary butyl mercaptan.*—180 g. of tertiary butyl mercaptan and 64 g. of sulphur were refluxed with 1 cc. of monobutylamine. After cooling the mixture was filtered and distilled to give the following fractions:

(1) To 90° C. at 15 mm. (unreacted mer- and by-products) _____ g__ 23
(2) 99°–112° C. at 10 mm. (tertiary di-butyl tri-sulphide) _____ g__ 98
(3) 112°–130° C. at 10 mm. (intermediate) _____ g__ 9
(4) 130°–145° C. at 10 mm. (tertiary di-butyl tetrasulphide) _____ g__ 60
(5) Residue _____ g__ 9

EXAMPLE IV.—*Sulphurization of di-butyl di-sulphide.*—To 242 g. of di-butyl di-sulphide and 75 g. of sulphur was added 5 cc. of monobutylamine. The mixture was refluxed for 15 minutes and upon filtration and distillation the reaction mass was found to contain:

(1) To 115° C. at 10 mm. (di-butyl di-sulphide) _____ g__ 96
(2) 115°–14° C. at 10 mm. (di-butyl tri-sulphide) _____ g__ 128
(3) Residue _____ g__ 80

EXAMPLE V.—*Sulphurization of ethyl mercaptan.*—800 g. of ethyl mercaptan and 192 g. of flowers of sulphur were charged into a 3-neck, 5 liter, round-bottom flask, fitted with a reflux condenser. The mixture was cooled to a temperature of −20° C. and 5 g. of triethylamine added. No reaction occurred at this temperature, but on being allowed to warm to −8° C. the reaction proceeded very smoothly. The temperature remained constant for a considerable time, and heat was then applied until a temperature of 80° C. was reached.

The mixture was then washed with very dilute hydrochloric acid and dried with anhydrous potassium carbonate. 700 g. of product was recovered and fractionated in a 36 inch Vigreaux column. The following cuts were obtained:

(1) To 90° C. _____ g__ 35
(2) 90°–150° C. (sp. gr. at 20° C., .993) ___ g__ 92
(3) 85° C. at 70 mm. (sp. gr. at 20° C., .992) _____ g__ 343
(4) 85°–90° C. at 70 mm. (sp. gr. at 20° C., .990) _____ g__ 148
(5) 120°–130° C. at 80 mm. (sp. gr. at 20° C., 1.080) _____ g__ 72
(6) Residue _____ g__ 10

The cuts boiling below 90° C. at 70 mm. were reasonably pure di-ethyl di-sulphide, and the higher cuts consisted principally of di-ethyl tri-sulphide.

EXAMPLE VI.—*Sulphurization of thiophenol.*—11 g. of thiophenol was placed in a test tube and 1.6 g. of sulphur was added. A rod, moist with ammonia water, was held above the liquid. The upper surface of the mercaptan solution assumed an orange color and, upon shaking, a vigorous reaction set in with considerable evolution of hydrogen sulphide. When the evolution of hydrogen sulphide had ceased, the material was placed in a water bath and warmed for one-half hour at 95° C. Upon cooling, the product was washed with water and with an excess of 2% sodium hydroxide solution to remove any unreacted thiophenol. Upon cooling, the yellow oil solidified and was crystallized from methyl alcohol. The product so obtained was in the form of colorless needles which melted at 61° C., indicating that it consisted of di-phenyl di-sulphide. The reaction by which this compound was formed may be expressed as follows:

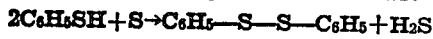

$$2C_6H_5SH + S \rightarrow C_6H_5-S-S-C_6H_5 + H_2S$$

EXAMPLE VII.—*Sulphurization of benzyl mercaptan.*—12.4 g. of benzyl mercaptan was placed in a test tube with 1.6 g. of flowers of sulphur. A drop of triethylamine was added and a vigorous reaction set in with the evolution of hydrogen sulphide. When this had subsided, the material was warmed on a water bath for one-half hour and then washed with water and with dilute sodium hydroxide solution. Upon cooling, the yellow oil solidified and was crystallized from methyl alcohol. In this manner, the product was obtained in the form of pale yellow rosettes, which melted between 63° and 69° C., indicating that it consisted of di-benzyl di-sulphide, formed in accordance with the following equation:

$$2C_6H_5CH_2-SH + S \rightarrow C_6H_5CH_2-S-S-CH_2C_6H_5 + H_2S$$

EXAMPLE VIII.—*Sulphurization of thioglycollic acid.*—Thioglycollic acid was converted to its sodium salt by the addition of a molecular equivalent of sodium hydroxide. The product was evaporated under vacuum on a water bath until it became a pasty solid. 11.4 g. of this solid was dissolved in 20 cc. of methyl alcohol and 1.6 g. of flowers of sulphur was added. 1 cc. of a 10% solution of sodium hydroxide in methyl alcohol was then added. The solution turned to an orange color and a considerable evolution of hydrogen sulphide occurred, resulting in the sulphurization of the thioglycollic acid to dithio-diglycollic acid, in accordance with the following equation:

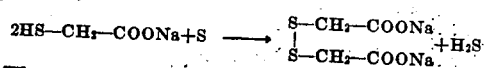

$$2HS-CH_2-COONa + S \rightarrow \begin{array}{c} S-CH_2-COONa \\ | \\ S-CH_2-COONa \end{array} + H_2S$$

The procedure of the invention as discussed above is also applicable to the sulphurization of thiol containing amino acids, such, for example, as cysteine, to produce cystine and related compounds.

The invention is also applicable to the sulphurization of polymercaptans, such as ethylene di-mercaptan, as indicated by the following example:

EXAMPLE IX.—184 g. of ethylene di-mercaptan produced by reaction of sodium hydrosulphide on ethylene di-chloride are placed, together with 128 g. of sulphur, in a 1 liter, round-bottom flask, and 1 cc. of triethylamine is added. The reaction begins almost immediately with the evolution of hydrogen sulphide. When the evolution of hydrogen sulphide ceases, the product is warmed to 60° C. and allowed to cool. Steam is now passed into the reaction mixture to remove the volatile odoriferous substances; a sticky resinous mass separating at the same time. Steam condensate is poured off of this material and the product is heated on a hot plate at 100 to 110° C., while stirring. In this manner there is obtained a pale yellow resinous mass possessing considerable elasticity.

The catalysts suited to the purposes of this invention include those compounds having an alkaline reaction such as oxides and hydroxides of the metals, alkali metal sulphides, ammonia, amines, etc., but the amines are preferred for their solubility in the reaction mixtures. It has been found that the aryl amines, such as aniline, are operative for the present purpose, as well as the aliphatic amines such as those described in the specific examples given above. Temperature apparently may vary over a wide range, the mercaptans reacting to form di-sulphides at room temperature, while sulphurization of polysulphides usually proceeds more rapidly at elevated temperatures. Pressure is unnecessary and the hydrogen sulphide formed by the reaction may be permitted to escape without adverse effect. This latter factor and the extremely small amounts of catalyst employed clearly indicate that the present reaction is different in nature from previous processes using similar catalysts for the preparation of polysulphides from olefins.

Modifications will be obvious to those skilled in the art and I do not therefore wish to be limited except by the scope of the sub-joined claims.

I claim:

1. The process which comprises reacting a sulphur-containing organic compound with sulphur in the presence of a catalytic amount of a basic catalyst.
2. The process of claim 1 characterized in that the said catalyst is soluble in the reaction mixture.
3. The process of claim 1 characterized in that the said catalyst is an amine.
4. The process of claim 1 characterized in that the said catalyst is an alkyl amine.
5. The process of claim 1 characterized in that the said catalyst is tri-butyl amine.
6. The process of claim 1 characterized in that the said catalyst is a compound chosen from the class consisting of tri-butyl amine and tri-amyl amine.
7. The process which comprises reacting an aliphatic mercaptan with sulphur in the presence of a catalytic amount of a basic catalyst.
8. The process of claim 7 characterized in that the said catalyst is soluble in the reaction mixture.
9. The process of claim 7 characterized in that the said catalyst is an amine.
10. The process of claim 7 characterized in that the said catalyst is an alkyl amine.
11. The process of claim 7 characterized in that the said catalyst is tri-butyl amine.
12. The process of claim 7 characterized in that the said catalyst is a compound chosen from the class consisting of tri-butyl amine and tri-amyl amine.
13. The process which comprises reacting a thio phenol with sulphur in the presence of a catalytic amount of a basic catalyst.
14. The process which comprises reacting a thio acid with sulphur in the presence of a catalytic amount of a basic catalyst.
15. The process of claim 13 characterized in that the said catalyst is an alkyl amine.
16. The process of claim 13 characterized in that the said catalyst is an alkyl amine chosen from the class consisting of tri-butyl amine and tri-amyl amine.
17. The process of claim 14 characterized in that the said catalyst is an alkyl amine.
18. The process of claim 14 characterized in that the said catalyst is an alkyl amine chosen from the class consisting of tri-butyl amine and tri-amyl amine.

JOHN F. OLIN.

CERTIFICATE OF CORRECTION.

Patent No. 2,237,625.  April 8, 1941.

JOHN F. OLIN.

It is hereby certified that error appears in the printed specification of the above numbered patent requiring correction as follows: Page 2, first column, line 38, for "90° C." read --99° C.--; same line, for the syllable "mer-" read --mercaptan--; line 56, for "115°-14° C." read --115°-140° C.--; and that the said Letters Patent should be read with this correction therein that the same may conform to the record of the case in the Patent Office.

Signed and sealed this 3rd day of June, A. D. 1941.

(Seal)

Henry Van Arsdale,
Acting Commissioner of Patents.